(12) United States Patent
Görtler et al.

(10) Patent No.: US 6,422,190 B1
(45) Date of Patent: Jul. 23, 2002

(54) HEATING SYSTEM MOUNTED IN A VEHICLE WITH AN INTERNAL COMBUSTION ENGINE

(75) Inventors: Thomas Görtler, Weissenhorn; Sabine Kiesel, Esslingen, both of (DE)

(73) Assignee: J. Eberspächer GmbH & Co. KG (DE)

(*) Notice: Subject to any disclaimer, the term of this patent is extended or adjusted under 35 U.S.C. 154(b) by 0 days.

(21) Appl. No.: 09/508,478

(22) PCT Filed: Jul. 15, 1998

(86) PCT No.: PCT/DE98/02015

§ 371 (c)(1),
(2), (4) Date: Mar. 9, 2000

(87) PCT Pub. No.: WO99/14068

PCT Pub. Date: Mar. 25, 1999

(30) Foreign Application Priority Data

Sep. 12, 1997 (DE) .......................... 197 40 062

(51) Int. Cl.[7] .......................... F02N 17/02
(52) U.S. Cl. .......................... 123/142.5 R
(58) Field of Search .......................... 123/142.5 R

(56) References Cited

U.S. PATENT DOCUMENTS

| | | | |
|---|---|---|---|
| 5,632,443 A | * 5/1997 | Quarrie | 237/12.3 C |
| 5,806,479 A | * 9/1998 | Bauer et al. | 123/142.5 R |
| 5,855,319 A | * 1/1999 | Burner et al. | 237/12.3 |
| 6,034,352 A | * 3/2000 | Gortler et al. | 219/202 |

FOREIGN PATENT DOCUMENTS

| | | |
|---|---|---|
| DE | 295 01 064 U | 4/1995 |
| DE | 195 46 262 C | 2/1997 |
| DE | 196 01 319 A | 7/1997 |

\* cited by examiner

*Primary Examiner*—Marguerite McMahon
*Assistant Examiner*—Jason Benton
(74) *Attorney, Agent, or Firm*—McGlew and Tuttle, P.C.

(57) ABSTRACT

A heating system (1) is provided mounted in a motor vehicle with an internal combustion engine. The system (1) includes an additional heating system (2 or 3) or an auxiliary heating system (4). The additional heating system (2 or 3) or the auxiliary heating system (4), or a part thereof, is made in the shape of a modular component mounted on or connected to interfaces (I, II, III, IV) of the heating system which are specific for each vehicle. The modular component can optionally be replaced by another modular component of the same type.

9 Claims, 3 Drawing Sheets

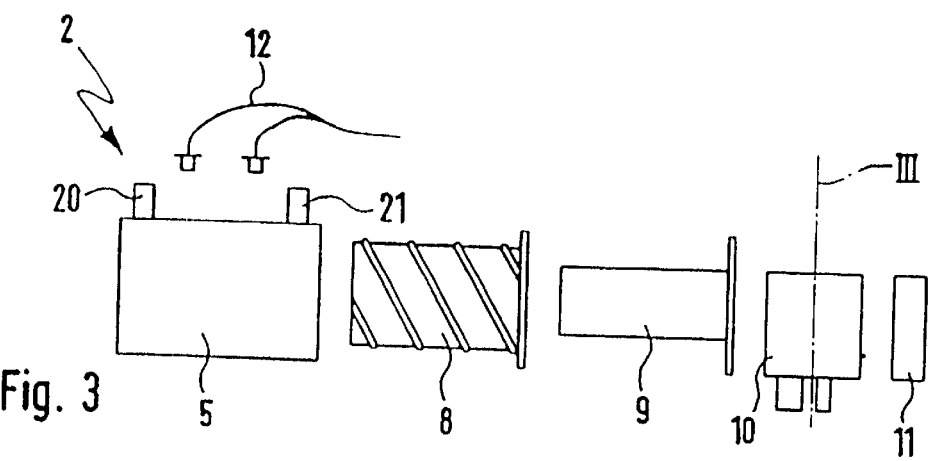
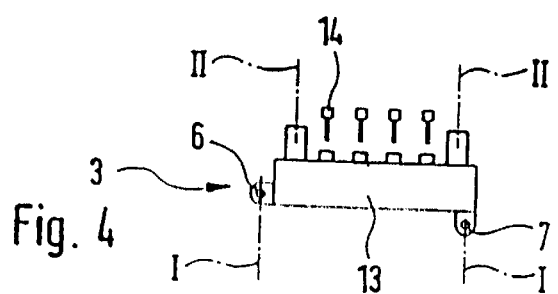
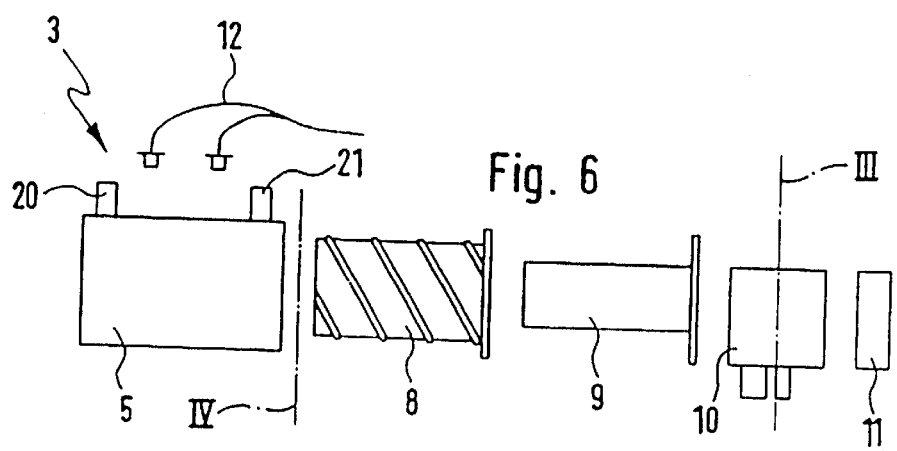
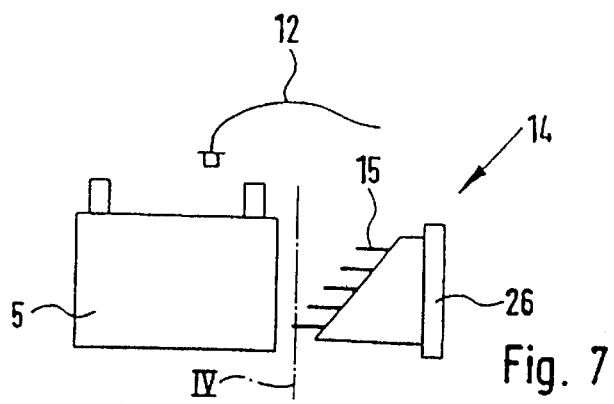

HEATING SYSTEM MOUNTED IN A VEHICLE WITH AN INTERNAL COMBUSTION ENGINE

FIELD OF THE INVENTION

The present invention pertains to a heating system in a motor vehicle with an internal combustion engine, wherein an additional heating system or an auxiliary heating system is provided.

BACKGROUND OF THE INVENTION

Additional heat sources are needed to compensate the heating deficit in motor vehicles with modern, highly efficient internal combustion engines. These systems support the vehicle's own heat circulation during the heat-up phase of the internal combustion engine or during the entire operation of the vehicle.

A prior-art additional heat source for supporting the vehicle's own heat output is, e.g., a fuel-operated additional heating system (diesel or gasoline), which is arranged in the water or coolant/heating medium circuit of the internal combustion engine and supplies heating energy to the heating system of the motor vehicle as needed. Individual components of the fuel-operated additional heating system are replaceable, so that different heat outputs, fuels (diesel or gasoline), applications, etc., can be obtained.

The advantages of fuel-operated auxiliary heaters are essentially:

High basic heat output with 3 kW, variable heat output up to 5 kW, high heating comfort, high efficiency.

The relatively high manufacturing and installation costs as well as the generation of environmentally harmful waste gases are a drawback. Noise is also generated during the combustion of the fuel.

Other prior-art heat sources are electric auxiliary heaters, e.g., PTC auxiliary heaters or sheathed element glow plug type auxiliary heaters.

The advantages of electric auxiliary heaters are essentially:

Low cost of application, low cost (parts including application), very small space requirement, absence of noise and emissions.

The drawbacks are especially the limited auxiliary heat output, the low efficiency and the high requirements on the onboard electric power supply system in the vehicle.

SUMMARY AND OBJECTS OF THE INVENTION

The object of the present invention is to provide a heating system that has a simple design and makes possible a flexible design of a heating system tailored to the individual user and also a problem-free maintenance with simple means.

According to the invention, a motor vehicle heating system and system process for a motor vehicle with an internal combustion engine is provided. The heating system has one of an additional heating system and an auxiliary heating system. The additional heating system and the auxiliary heating system or a part of the additional heating system or a part of the auxiliary heating system are provided as a modular component. Interfaces that are a fixed part of the motor vehicle are provided. The modular component is arranged and connected at the interfaces, whereby one modular component may be replaced with another modular component.

A first vehicle-specific interface (I) is formed by at least two fastening points. The fastening points are fixed parts of the vehicle. The fastening points define mechanical fastening locations at which the modular component can be mechanically fastened. The interfaces include a second vehicle-specific interface (II) defining an interruption point of a coolant/heating medium circuit of the internal combustion engine. The additional heating system is provided as a fuel-operated additional heating system and the auxiliary heating system is provided as an electric additional heating system. The fuel-operated additional heating system or the electric additional heating system is hydraulically connectable and and replacable, one with the other. The interfaces include a third vehicle-specific interface (III) comprising at least one electric connection, which is a fixed part of the vehicle and at which the electric additional heating system or an electric component of the electric additional heating system or of the fuel-operated additional heating system can be electrically connected.

The electric component of the electric additional heating system or of the fuel-operated additional heating system may be a control device. The modular component may be a complete, fuel-operated, additional heating system which comprises a water jacket or a coolant/heating medium jacket with fastening points arranged in a defined pattern, a heat exchanger, a combustion chamber, a side channel fan, a control device and a sensor unit. The modular component may also be a complete electric additional heating system with a water jacket or coolant/heating medium jacket of its own with fastening points arranged in a defined pattern and one or more integrated electric heating elements.

The additional heating system may be a fuel operated additional heating system or an electric additional heating system with a waterjacket or coolant/heating medium jacket fastened as a fixed part of the vehicle. The interfaces may include another (a fourth) vehicle-specific interface, which is a fixed part of the vehicle and via which the additional heating system can be rigidly connected.

The essence of the present invention is that the additional heating system or auxiliary heating system or part of the additional heating system or auxiliary heating system is designed as a modular component, which is arranged on or connected to interfaces of the heating system that are specific of the vehicle and can optionally be replaced with another such modular component.

In particular, the heating system has a first interface specific of the vehicle in the form of at least two fastening points that are fixed parts of the vehicle and to which the modular component can be mechanically fastened.

In addition, a second interface specific of the vehicle may be an interruption point of the coolant/heating medium circuit of the internal combustion engine, to which a fuel-operated additional heating system or an electric additional heating system can be hydraulically connected and can be replaced, in particular, with an additional heating system operated with the other type of energy.

A third interface specific of the vehicle is preferably at least one electric connection, which is a fixed part of the vehicle and to which an electric additional heating system or an electric component of the electric additional heating system or of the fuel-operated additional heating system, especially the control device thereof or a fan, can be electrically connected.

A first modular component is, in particular, a complete, fuel-operated additional heating system, which comprises a water jacket or a coolant/heating medium jacket with fixed fastening points arranged in a defined pattern, a heat exchanger, a combustion chamber, a fan, especially a side channel fan, a control device, and a sensor unit.

A second modular component is advantageously a complete electrical additional heating system, which has a water jacket or coolant/heating medium jacket of its own with fastening points arranged in a defined pattern and one or more integrated electric heating elements (so-called "monocoque design").

The flexibility of a heating system is further increased if, in an advantageous variant of the present invention, a water jacket or coolant/heating medium jacket of a fuel-operated (or electric) additional heating system is rigidly fastened to the vehicle and has a fourth interface, which is specific of the vehicle, is a fixed part of the vehicle, and via which the rest of the fuel-operated (or electric) additional heating system, designed as the third modular component, can be rigidly connected.

The third modular component may be a fuel-operated additional heating system part, with a heat exchanger, a combustion chamber, a fan, especially a side channel fan, an electric control device and a sensor unit, i.e., an above-mentioned, complete, fuel-operated auxiliary heater without water jacket, wherein this modular component is mounted and fastened in the water jacket in a positive-locking manner via the fourth interface that is a fixed part of the vehicle.

However, the third modular component may also be an electric additional heating system part, especially an electric heating element module, which is mounted and fastened in the water jacket in a positive-locking manner via the fourth interface that is a fixed part of the vehicle.

The electric heating element of an electric additional heating system is, in particular, a heating coil, but it may also be a sheathed element glow plug or a sheathed element glow plug arrangement with a plurality of sheathed element glow plugs in an advantageous embodiment.

The sheathed element glow plugs are preferably located in an aluminum jacket.

To enlarge the heat transfer surfaces, the electric heating elements (sheathed element glow plugs, heating coils, etc.) may also be provided, in particular, with additional heat exchanger plates.

The modular component may also be a gas- and especially liquefied gas-operated additional heating system or part of such an additional heating system.

A maximum of flexibility is achieved in heating systems in motor vehicles through the present invention with astonishingly simple means, which is beneficial not only to the manufacturer, but also to the user or the middleman, not only in terms of the individual (original or subsequent) design of a heating system in a certain motor vehicle, in terms of the mode of operation with a fuel, the heat output, size, etc., or the like, depending on what advantages are desired (and what drawbacks of a mode of operation can be accepted in the particular case), but also concerning maintenance, installation, etc. In the case of the embodiment of a heating system according to the present invention, it is possible, in principle, to resort to prior-art heating systems and thus to use the experience gained with them before.

A customer of a manufacturer of a heating system, e.g., a vehicle manufacturer, can consequently embody both heating systems in a certain vehicle model with simple means.

Additional heating systems can also be retrofitted in a motor vehicle with simple means. Should, e.g., additional heating systems integrated in the water circuit become successful on the market in the medium and longer term, because engines must be brought very rapidly to the operating temperature because of increasingly strict exhaust gas regulations and the cost of application of alternative systems (e.g., exhaust gas systems) is also very high, such additional heating systems can be subsequently installed as a component or module without problems and rapidly without major technical expertise, because the interfaces are already present on the vehicle.

The integration of such an electrically operated heating system in so-called electric vehicles, i.e., in vehicles equipped with an electric drive, is also particularly interesting, because the emission-and noise-free operation is particularly advantageous precisely in this case.

Consequently, a so-called MEC (Multi Energy Concept) system is created as a result by the present invention; its advantages are mainly:

Universal heating output from 0 kW to 5 kW, broad bandwidth of various additional heating solutions; it is possible as a result, e.g., to adapt the additional heating variant to the cost target of a customer, minimum cost of application at a customer or motor vehicle manufacturer universal applicability, the retrofitting of the additional heating system to an auxiliary heater is possible at minimum effort, only one supplier is necessary for all systems, the interfaces (water circuit, chassis, electric system, etc.) are the same at the manufacturer of the heating system and at the customer or vehicle manufacturer, and possibly even at different customers.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 3 is a schematic pulled-apart representation of the fuel-operated additional heating system according to FIG. 1;

FIG. 4 is a schematic pulled-apart representation of the electric additional heating system according to FIG. 2;

FIG. 6 is a schematic pulled-apart representation of the fuel-operated additional heating system according to FIG. 3 with an additional interface that is a fixed part of the vehicle;

FIG. 7 is a schematic view of another electric additional heating system with the same additional interface, which is a fixed part of the vehicle, as in FIG. 6.

DESCRIPTION OF THE PREFERRED EMBODIMENT

Figure 1:
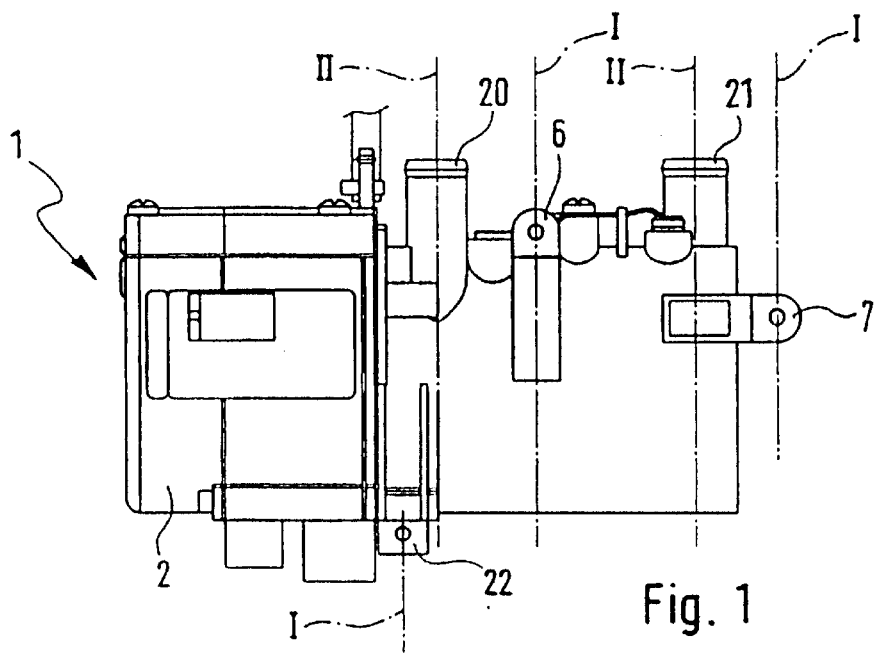
FIG. 1 is a schematic vertical partial sectional view of a fuel-operated additional heating system with preset interfaces that are fixed parts of the vehicle.

Referring to the drawings in particular, FIG. 1 shows a heating system 1 (for a motor vehicle, not shown, with an internal combustion engine) comprising a fuel-operated additional heating system 2, which has interfaces related to the vehicle in a preset pattern, hereinafter called "vehicle-specific interfaces or interfaces that are a fixed part of the vehicle."

A first vehicle-specific interface I is formed by the fastening points 6, 7 and 22 of the fuel-operated additional heating system 2, which have a defined size and shape and are located in a determined position in relation to one another (and in relation to the vehicle), so that the additional heating system, which is a single, modular component, is fastened in a motor vehicle locally in a clearly defined manner in a simple manner and can be optionally detached and replaced with another such modular component.

A second vehicle-specific interface II is defined by the hydraulic connections 20, 21, which are assigned to an interruption point of a heating medium/coolant circuit (not shown) of the internal combustion engine of the motor vehicle, so that after defined fastening in a vehicle via a first interface I, the additional heating system 2 with its connections 20, 21 is located at the point or in the area of the point at which the interruption point is also provided in the vehicle and the person skilled in the art can consequently easily establish a hydraulic connection between the additional heating system 2 and the coolant/heating medium circuit of the engine if necessary.

A third vehicle-specific interface III between the additional heating system 2 and the vehicle is defined by one or more electric connections, e.g., plugs or pins, by which electric consumer parts of the additional heating system 2 (e.g., the control device or the fan motor) can be electrically connected at a defined, preset point on a vehicle in a simple manner and can be supplied with current from the onboard power supply system.

There also is a fourth vehicle-specific interface IV, which will be discussed in greater detail later.

Figure 2:
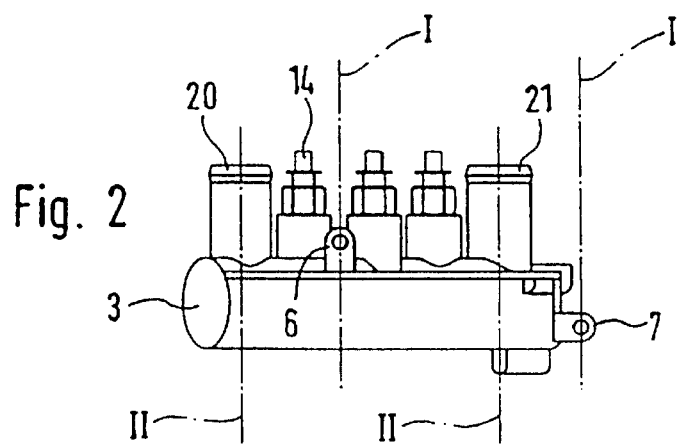
FIG. 2 is a schematic vertical partial sectional view of an electric additional heating system with the same preset interfaces, which are fixed parts of the vehicle, as in FIG. 1.
Figure 8:
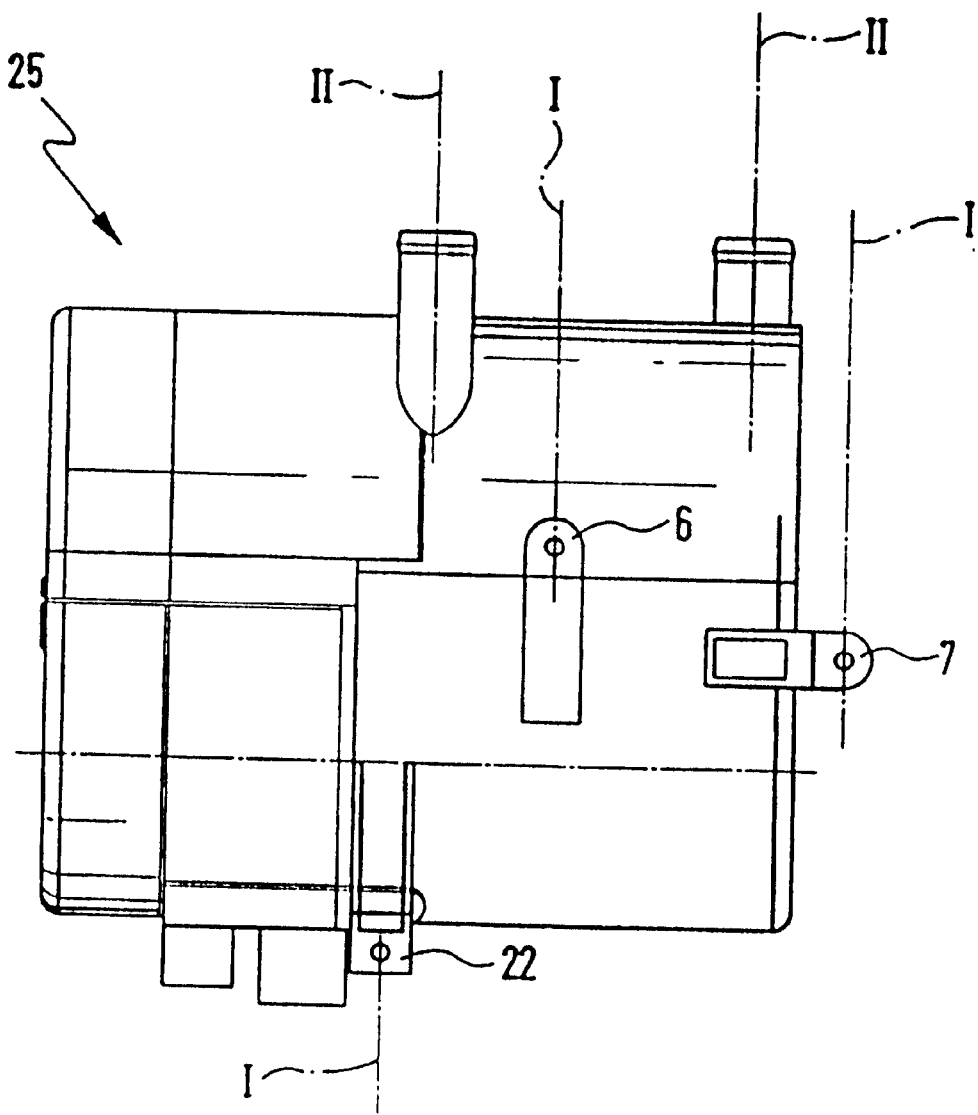
FIG. 8 is a schematic view of the variant according to FIG. 1 after conversion into an auxiliary heating system.

A fuel-operated additional heating system 2, designed as a modular additional heating system, can be replaced particularly easily in a vehicle with an electric additional heating system 3 according to FIG. 2, which is designed as a modular component, via the above-mentioned vehicle-specific interfaces I, II, III, and IV. As can be recognized especially from FIGS. 1 and 2, the position and the size of the fastening points 6 and 7 are the same in the additional heating systems 2 and 3. The fastening point 22 is not needed for the electric additional heating system 3 (which has smaller dimensions), but it is possibly needed for another, larger modular, fuel-operated additional heating system 2 or for the installation of a modularly designed auxiliary heating system 25 according to FIG. 8, which provides heating energy for the heating system of the motor vehicle and/or for the interior space of the vehicle when needed.

Consequently, e.g., a fuel-operated additional heating system 2 can be easily replaced according to the present invention with an electric additional heating system 3 or vice versa.

FIG. 3 shows a larger detail of the fuel-operated additional heating system 2 according to FIG. 1 in a pulled-apart representation, which is a (first) modular component, comprising especially a water jacket 5 or a coolant/heating medium jacket with fixed fastening points 6, 7 arranged in a defined pattern, a heat exchanger 8, a combustion chamber 9, a fan 10, especially a side channel fan, a control device 11, and a sensor unit 12.

FIG. 4 schematically shows a pulled-apart representation of an electric additional heating system 3 according to FIG. 2, which is a (second) modular component, comprising especially a water jacket 13 or coolant/heating medium jacket with fastening points 6, 7 arranged in a defined pattern and a plurality of integrated electric heating elements in the form of sheathed element glow plugs 14 in a so-called "monocoque design," i.e., in a design in which the sheathed element glow plugs 14 are integrated with the water jacket, which is a casting in most cases, wherein the fastening points 6, 7 and fastening lugs are also an integrated component of the water jacket. The heating system has no control unit of its own and is equipped with guiding devices (so-called "fences") in the inside to optimize the efficiency and to protect the sheathed element glow plugs.

Figure 5:
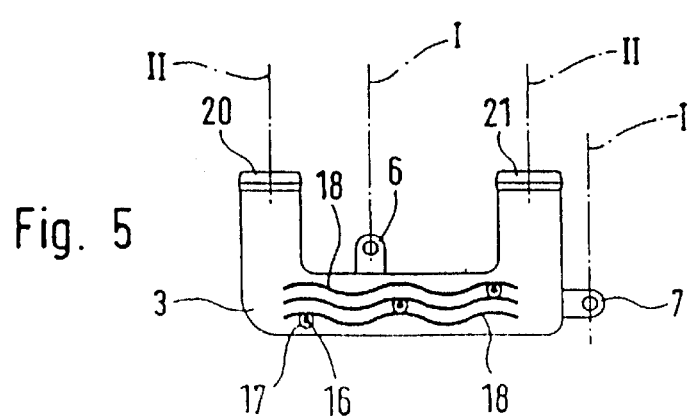
FIG. 5 is a schematic view of another electric additional heating system in a representation similar to that in FIG. 4.

An electric additional heating system 3 may also be designed, e.g., in the manner shown in FIG. 5 and have sheathed element glow plugs 16 in a water jacket, wherein the sheathed element glow plugs 16 themselves are arranged in an aluminum jacket 17. The sheathed element glow plugs 16 are provided with additional heat exchanger plates 18 to obtain a larger heat transfer surface.

The exemplary embodiment shown in FIG. 6 corresponds essentially to that according to FIG. 3, and the above-mentioned additional, vehicle-specific, fourth interface IV is arranged here "behind" the water jacket 5.

In particular, the water jacket 5 is an independent component according to this variant and is fastened to the vehicle via its fastening points 6, 7 and 22. The modular component is determined by the rest of the fuel-operated additional heating system here, and the sensor unit 12 or the sensors, like the water jacket 5, may already be a fixed component of the vehicle, not belonging to the module. Consequently, if the water jacket 5 is the same or identical (and perhaps if the sensor unit 12 is the same), the rest of the additional heating system, which rest is a modular component itself, can be removed and, e.g., replaced with a (third) modular part of an electric additional heating system 3 according to FIG. 7 in such an arrangement via the interface IV. The third modular part of an electric additional heating system 3 according to FIG. 7 is, in particular, an electric heating element module 14, and this is mounted and fastened in the water jacket 5 in a positive-locking manner via the fourth interface IV, which is a fixed part of the vehicle.

The electric heating element of an electric additional heating system 3 may be a heating coil. According to FIG. 7, a plurality of electric heating elements are provided in the form of sheathed element glow plugs 15, which are arranged in a base part 26, which fits the water jacket 5 in a positive-locking manner.

The additional heating system may also be a fourth modular component and be operated with gas, especially liquefied gas. Consequently, an auxiliary heater variant with gas is also possible due to the modular design. The variant shown in FIG. 7 can be converted into a gas-operated additional heater or auxiliary heater variant in a very simple manner by correspondingly selecting a suitable gas burner.

While specific embodiments of the invention have been shown and described in detail to illustrate the application of the principles of the invention, it will be understood that the invention may be embodied otherwise without departing from such principles.

What is claimed is:

1. A motor vehicle heating system for a motor vehicle with an internal combustion engine, the heating system comprising:

a support interface with at least two fastening points that are positionally fixed parts of a vehicle to which the support interface is installed;

a heating medium interface including a fluid exit connection to a coolant/heating medium circuit of the internal combustion engine and a fluid intake connection to the coolant/heating medium circuit of the internal combustion engine, said fluid exit connection and said fluid intake connection being positionally fixed parts a vehicle to which the heating medium interface is installed;

a first modular component including coolant/heating medium jacket with a first fluid connection and a second fluid connection, said first fluid connection and said second fluid connection being in spatially defined positions to connect with said fluid exit connection and said fluid intake connection and said first modular unit including fixed fastening points arranged in spatially defined positions for connection with said two fastening points of said support interface; and a second modular component including a coolant/heating medium jacket a second modular unit first fluid connection and a second modular unit second fluid connection, said second modular unit first fluid connection and said second modular unit second fluid connection being in spatially defined positions to connect with said fluid exit connection and said fluid intake connection and said second modular unit including second modular unit fixed fastening points arranged in spatially defined positions for connection with said two fastening points of said support interface, one of said first modular unit and said second modular unit being connected to said support interface and to said heating medium interface.

2. A vehicle heating system process for a motor vehicle with an internal combustion engine, the heating system process comprising the steps of:

providing a vehicle with a support interface with at least two fastening points that are positionally fixed parts of the vehicle, a heating medium interface including a fluid exit connection to a coolant/heating medium circuit of the internal combustion engine and a fluid intake connection to the coolant/heating medium circuit of the internal combustion engine, said fluid exit connection and said fluid intake connection being positionally fixed parts of the vehicle and with an electrical interface with an electric connection as a positionally fixed part of the vehicle;

providing a first modular component including a fuel-operated additional heating system with a heat exchanger, a combustion chamber, a fan, a control device, a sensor unit and a heating medium jacket with a first fluid connection and a second fluid connection, said first, fluid connection and said second fluid connection being in spatially defined positions to connect with said fluid exit connection and said fluid intake connection, said first modular unit including fixed fastening points arranged in defined positions for connection with said two fastening points of said support interface and said first modular unit including an electrical interface with a fixed position relative to said fixed fastening points;

providing a second modular component including an electrical additional heating system with an electric heating element, a coolant/heating medium jacket, a second modular unit first fluid connection and a second modular unit second fluid connection, said second modular unit first fluid connection and said second modular unit second fluid connection being in spatially defined positions to connect with said fluid exit connection and said fluid intake connection and said second modular unit including second modular unit fixed fastening points arranged in defined positions for connection with said two fastening points of said support interface and said second modular unit including an electrical interface with a fixed position relative to said second modular unit fixed fastening points; and connecting one of said first modular unit and said second modular unit to said support interface and to said heating medium interface and to said electrical interface.

3. The system in accordance with claim 1, wherein said first modular component is a fuel- or gas-operated additional heating system with a heat exchanger, a combustion chamber, a side channel fan, a control device, and a sensor unit, and wherein said second modular component is an electric additional heating system with one or more integrated electric heating elements.

4. The system in accordance with claim 3, wherein an electric interface is provided for electrically connecting said electric additional heating system or a component of said electric additional heating system or of said fuel-operated additional heating system to the motor vehicle.

5. The system in accordance with claim 4, wherein said component of said electric additional heating system or of said fuel-operated additional heating system is a control device.

6. The system in accordance with claim 3, wherein said one or more integrated electric heating elements are of a monocoque design.

7. The system in accordance with claim 3, wherein said one or more integrated electric heating elements comprise a heating coil.

8. The system in accordance with claim 3, wherein said one or more integrated electric heating elements comprise a sheathed element glow plug.

9. The system in accordance with claim 3, wherein said one or more integrated electric heating elements comprise heat exchanger plates.

* * * * *